Figure 1:
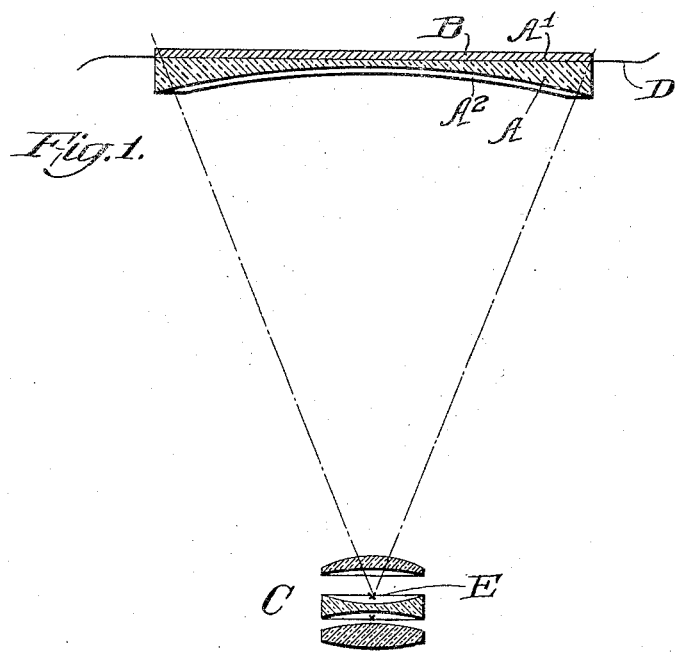

L. J. R. HOLST.
FILM SUPPORT FOR CAMERAS.
APPLICATION FILED JAN. 17, 1918.

1,315,307.

Patented Sept. 9, 1919.

Witness

Inventor
Lodewyk J. R. Holst
By Chandler & Hubbell
his Attorneys

UNITED STATES PATENT OFFICE.

LODEWYK J. R. HOLST, OF PHILADELPHIA, PENNSYLVANIA, ASSIGNOR TO ARTHUR BROCK, JR., OF PHILADELPHIA, PENNSYLVANIA.

FILM-SUPPORT FOR CAMERAS.

1,315,307.  Specification of Letters Patent.  Patented Sept. 9, 1919.

Application filed January 17, 1918. Serial No. 212,343.

*To all whom it may concern:*

Be it known that I, LODEWYK J. R. HOLST, a citizen of the United States, residing in the city and county of Philadelphia, State of Pennsylvania, have invented a certain new and useful Improvement in Film-Supports for Cameras, of which the following is a true and exact description.

The purpose of the present invention is to provide means whereby in fixed focus film cameras the film can be maintained accurately flat by resting on a transparent support, being pressed in contact therewith by pressure plates, and by which means the shortening or distortion of the image is prevented. Glass plates have been used to support the film area which is to be exposed, but when doing so by means of the usual piece of flat plate glass, the shortening of the image due to the refraction of the supporting plate becomes too apparent when the image is increased in size, say beyond 5x7 inches. To overcome this refraction, and thereby eliminate the effect of shortening the image, is the purpose of the present invention. The nature of my invention will be best understood as described in connection with the drawing in which it is diagrammatically illustrated, and in which Figure 1 shows the general character of my invention, and Fig. 2 a preferred modification.

A is the glass supporting plate having a flat supporting surface A' and spherical surface $A^2$ turned toward the lens. B is the presser plate holding the film D against the plate A. C is the lens the second nodal point of which is indicated at E. F is a point in advance of the nodal point determined as hereafter described.

As shown in Fig. 1 the spherical curvature $A^2$ of plate A is on a radius having its center at the nodal point E, from which it follows that all rays emanating from this nodal point will meet the spherical surface A normally, and hence will not be refracted in passing through the plate.

Figure 2:
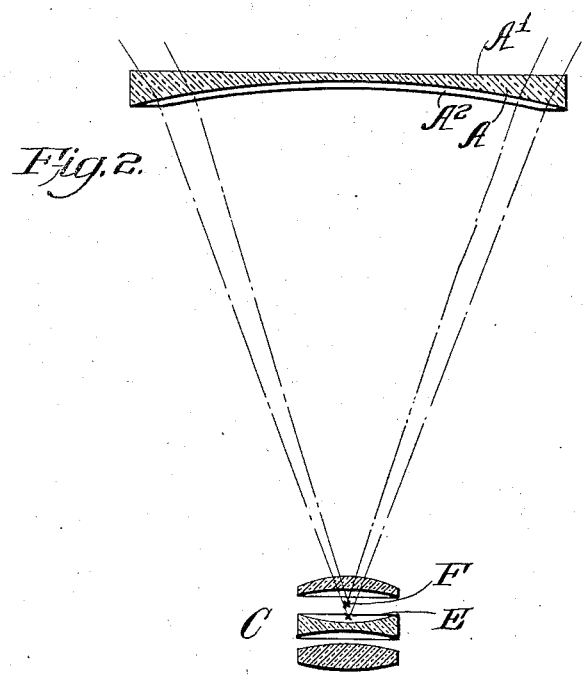

This construction, generally speaking, constitutes my invention. It is to be remembered, however, that the films are liable to shrink somewhat in development and fixing, and to offset such shrinking I prefer to form the spherical face $A^2$ of plate A on a radius centered at a point somewhat in advance of the second nodal point of the lens, as shown in Fig. 2, where the radius center is shown at F, the effect being to permit and cause an outward refraction of the rays passing through plate A to a degree gradually increasing toward the outer margin, which refraction will be compensated for by the subsequent shrinking of the film.

Having now described my invention, what I claim as new and desire to secure by Letters Patent, is:

1. In a film camera a transparent support for the film in the exposure aperture, the supporting surface of such support being flat, the surface of said support turned toward the lens being spherically curved from a point approximately coinciding with the second nodal point of the lens.

2. In a film camera a transparent support for the film in the exposure aperture, the supporting surface of such support being flat, the surface of said support turned toward the lens being spherically curved from a point approximately coinciding with the second nodal point of the lens, the radius of such curvature not exceeding the distance of the surface turned toward the lens to the said second nodal point thereof.

LODEWYK J. R. HOLST.